United States Patent
Im

(10) Patent No.: US 11,619,162 B2
(45) Date of Patent: Apr. 4, 2023

(54) APPARATUS AND METHOD FOR REMOVING CONDENSED WATER OF INTERCOOLER

(71) Applicants: Hyundai Motor Company, Seoul (KR); Kia Corporation, Seoul (KR)

(72) Inventor: Hyuk Im, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/495,440

(22) Filed: Oct. 6, 2021

(65) Prior Publication Data
US 2022/0349338 A1 Nov. 3, 2022

(30) Foreign Application Priority Data
May 3, 2021 (KR) .................. 10-2021-0057341

(51) Int. Cl.
 *F02B 29/04* (2006.01)
(52) U.S. Cl.
 CPC ...... *F02B 29/0468* (2013.01); *F02B 29/0462* (2013.01)
(58) Field of Classification Search
 CPC .................. F02B 29/0462; F02B 29/0468
 See application file for complete search history.

(56) References Cited

U.S. PATENT DOCUMENTS

| | | | | |
|---|---|---|---|---|
| 9,890,693 | B2* | 2/2018 | Bockstanz | F02B 29/0475 |
| 10,100,715 | B2* | 10/2018 | Dieterle | F02B 29/0468 |
| 2002/0092424 | A1* | 7/2002 | Liu | B03C 3/70 |
| | | | | 96/60 |
| 2007/0251249 | A1* | 11/2007 | Burk | F28F 3/027 |
| | | | | 62/304 |
| 2013/0291536 | A1* | 11/2013 | Koch | F02M 26/23 |
| | | | | 60/599 |
| 2014/0083398 | A1* | 3/2014 | Marceno | F28F 17/005 |
| | | | | 123/568.12 |
| 2016/0250671 | A1* | 9/2016 | Vigild | F02B 77/04 |
| | | | | 134/18 |

FOREIGN PATENT DOCUMENTS

| | | |
|---|---|---|
| JP | 2009-215904 A | 9/2009 |
| JP | 6120143 B2 | 4/2017 |
| KR | 2012-0063261 A | 6/2012 |

* cited by examiner

*Primary Examiner* — Ngoc T Nguyen
(74) *Attorney, Agent, or Firm* — Fox Rothschild LLP

(57) ABSTRACT

An apparatus for removing condensed water of an intercooler includes a collecting portion for collecting condensed water, the collecting portion being provided at a lower end of the intercooler; and an ultrasonic wave vibrator provided in the collecting portion, the ultrasonic wave vibrator being operated to introduce the condensed water collected in the collecting portion toward an engine so that the condensed water is vaporized, thereby removing or significantly reducing an amount of condensed water in the intercooler. The apparatus for removing condensed water of the intercooler can prevent engine damage and ignition failure due to the presence of the condensed water in the intercooler.

5 Claims, 3 Drawing Sheets

APPARATUS AND METHOD FOR REMOVING CONDENSED WATER OF INTERCOOLER

CROSS REFERENCE TO RELATED APPLICATION

The present application claims under 35 U.S.C. § 119(a) the benefit of Korean Patent Application No. 10-2021-0057341, filed May 3, 2021, the entire contents of which are incorporated by reference herein.

BACKGROUND

(a) Technical Field

The present disclosure relates generally to an apparatus and method for removing condensed water of an intercooler, more particularly, to the apparatus and method for removing condensed water of the intercooler, in which the apparatus may reduce an amount of condensed water in the intercooler by introducing the condensed water collected in a lower end of the intercooler toward an engine by using an ultrasonic wave vibrator.

(b) Description of the Related Art

An engine of a vehicle generates power by mixing outside air and fuel in a predetermined ratio and burning the mixture.

In a process of generating power by driving the engine, the outside air and the fuel are supplied to a cylinder, and the air and fuel are burned in the cylinder to obtain a desired output and combustion efficiency.

After the combustion process for generating power of the engine, exhaust gas is generated and the exhaust gas is discharged to the outside of the vehicle.

In the process of generating power by driving the engine, the desired output and combustion efficiency may be obtained only when sufficient air is supplied for combustion. A turbocharger is used as an apparatus that supercharges combustion air to increase the combustion efficiency of the engine.

In general, the turbocharger rotates a turbine by using pressure of exhaust gas discharged from the engine, and then supplies high pressure air to the cylinder by using a rotation force to increase output of the engine.

Air compressed by a compressor of the turbocharger is expanded as the temperature thereof rises, so density of oxygen in the air is reduced and filling efficiency of air into the cylinder of the engine is reduced.

The intercooler increases the density of the air by cooling the high temperature air compressed by the compressor of the turbocharger, whereby intake efficiency of the air introduced into the engine is increased to improve the combustion efficiency of the engine, to improve fuel efficiency, and to significantly reduce the emission of carbon dioxide.

When the high temperature of the air compressed by the compressor of the turbocharger is reduced by performing heat exchange in the intercooler, water vapor contained in the air condenses to generate condensed water and the condensed water is collected in a lower portion of the intercooler.

When the condensed water collected in the intercooler is not removed properly, the condensed water collected in the intercooler freezes in low temperature conditions (e.g., the winter). In this case, an air flow path is blocked or a sectional area of the flow path is reduced to reduce an amount of air introduced into the engine, thereby causing problems such as ignition failure, engine damages, jerking, etc.

The foregoing is intended merely to aid in the understanding of the background of the present disclosure, and is not intended to mean that the present disclosure falls within the purview of the related art that is already known to those skilled in the art.

SUMMARY

The present disclosure provides an apparatus and method for removing condensed water of an intercooler, wherein the apparatus may introduce condensed water collected in a lower end of the intercooler toward an engine by using the ultrasonic wave vibrator so that the condensed water is vaporized to reduce an amount of condensed water in the intercooler. In addition, the present disclosure is intended to overcome the problems of engine damage and ignition failure due to condensed water in the intercooler.

In order to achieve the above object, according to one aspect of the present disclosure, there is provided an apparatus for removing condensed water of an intercooler, the apparatus including: a collecting portion provided at the intercooler and configured to collect the condensed water of the intercooler; an ultrasonic wave vibrator provided in the collecting portion and configured to generate vibration during operation of the ultrasonic wave vibrator; and a controller configured to control the operation of the ultrasonic wave vibrator.

The apparatus may include: a condensed water sensor provided in the collecting portion and configured to detect an amount of collected condensed water, wherein, when the amount of condensed water in the collecting portion detected by the condensed water sensor is equal to or higher than a reference value, the controller may control the ultrasonic wave vibrator so that the ultrasonic wave vibrator may be operated.

The collecting portion may be provided to be connected, at a lower portion of the intercooler, to an inlet tube connected to an engine.

The condensed water sensor may be a level sensor configured to detect a water level of the collected condensed water in the collecting portion, and is configured to use either an electronic sensor or a floating sensor.

A method for removing condensed water of an intercooler according to the present disclosure may include: determining operating conditions, wherein it may be determined whether the operating conditions of an ultrasonic wave vibrator are satisfied or not in a state of vehicle ignition ON; determining an amount of condensed water, wherein when it is determined that the operating conditions of the ultrasonic wave vibrator are satisfied in the determining the operation conditions, it may be determined whether the amount of collected condensed water in a collecting portion is equal to or higher than a reference value; and removing condensed water, wherein when it is determined that the amount of collected condensed water in the collecting portion is equal to or higher than the reference value in the determining the amount of condensed water, the ultrasonic wave vibrator may be operated under control of a controller and thus the collected condensed water in the collecting portion may be introduced into an engine and then be vaporized due to operation of the ultrasonic wave vibrator, so that the condensed water in the collecting portion may be removed.

The method may include: performing post-processing for removing the condensed water in the collecting portion, wherein after the removing the condensed water, when it is determined that vehicle ignition is in a state of ignition OFF, the amount of collected condensed water in the collecting portion may be monitored for a predetermined time, and when the collected amount of condensed water in the collecting portion is determined to be equal to or higher than the reference value by the monitoring, the condensed water may be removed by additional operation of the ultrasonic wave vibrator.

In the determining the operating conditions, the operating conditions of the ultrasonic wave vibrator may include an operating entry condition of an exhaust gas recirculation device, and state conditions of the ultrasonic wave vibrator, the condensed water sensor, and a battery.

When it is determined that the operating entry condition of the exhaust gas recirculation device is satisfied and the ultrasonic wave vibrator, the condensed water sensor, and the battery are in a normal state, the determining the amount of condensed water may be performed.

In the performing the post-processing, the predetermined time required for monitoring the amount of condensed water may include a time when the condensed water of the intercooler is collected into the collecting portion after vehicle ignition is turned off.

In the performing the post-processing, the predetermined time required for monitoring the amount of condensed water maybe determined by considering a remaining amount of battery power so that the monitoring may be finished before a battery is discharged after vehicle ignition is turned off.

According to the present disclosure, in the apparatus and the method for removing condensed water of the intercooler, the collecting portion collecting condensed water is provided in the lower end of the intercooler, the collecting portion has the ultrasonic wave vibrator, and the ultrasonic wave vibrator is operated to introduce the condensed water collected in the collecting portion toward the engine so that the condensed water is vaporized, whereby the amount of condensed water collected in the intercooler may be removed or significantly reduced. Accordingly, the problems of engine damage and ignition failure due to the condensed water collected in the intercooler can be overcome and durability of the intercooler can be improved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
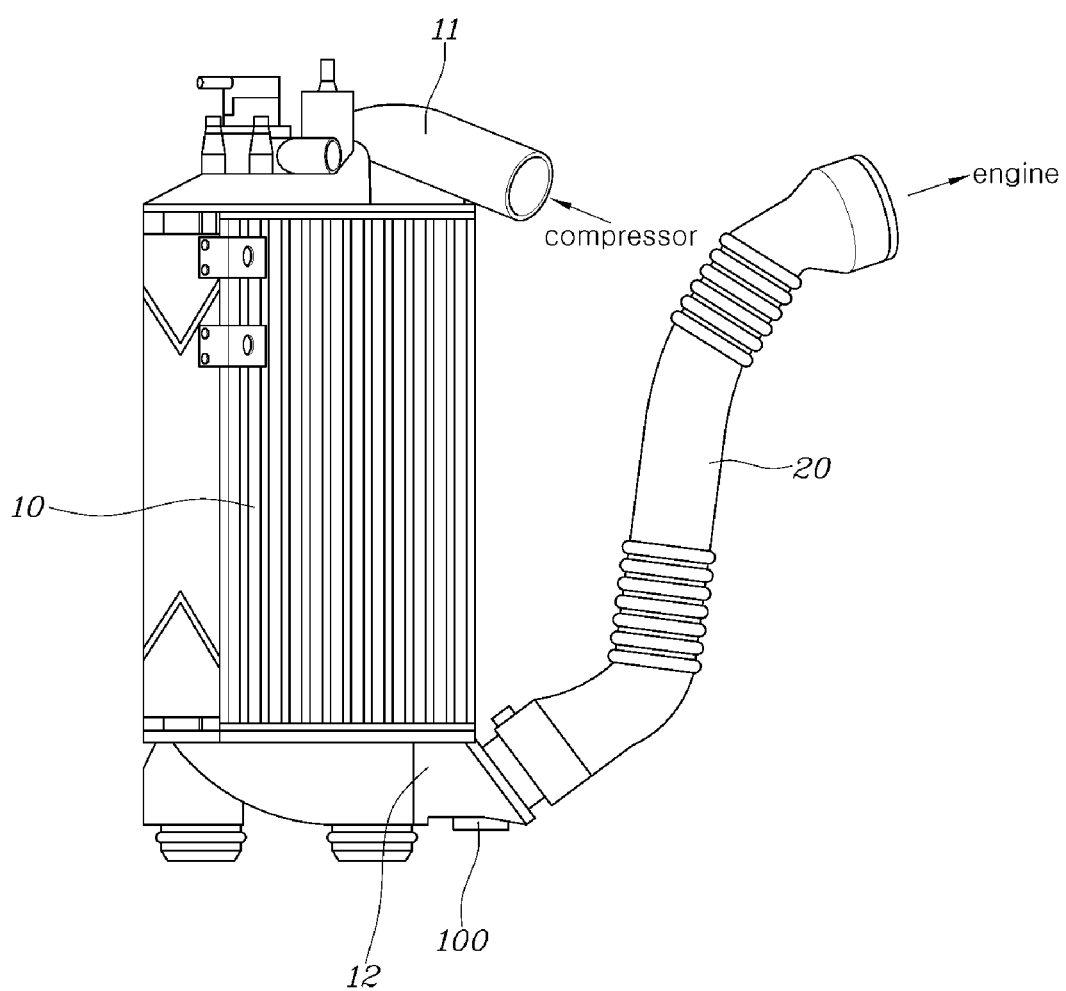
FIG. 1 is a view showing an intercooler having an apparatus for removing condensed water according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by telematics server or a Controller Area Network (CAN).

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, but these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used hereinto describe a relationship between elements, that is, "between", "directly between", "adjacent" or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control part (controller) according to the exemplary embodiment of the present disclosure may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. The processor may take one or more form.

Hereinafter, according to exemplary embodiments of the present disclosure, an apparatus and a method for removing condensed water of an intercooler will be described with reference to accompanying drawings.

A turbocharger of a vehicle is an apparatus that suctions exhaust gas or outside air to rotate a turbine so as to increase engine power, and supplies generated high temperature compressed air into a cylinder.

A compressor and the turbine constituting the turbocharger are rotated together while being connected to each other with a shaft. An air intake pipe is connected to the compressor so that fresh air (outside air) that has passed through an air cleaner is introduced into the compressor, the compressed air compressed through the compressor is introduced through the intercooler and into an intake manifold of an engine, and exhaust gas discharged through an exhaust manifold of the engine is moved into a catalytic converter through the turbine and then is discharged to the atmosphere through an exhaust gas discharge pipe.

The intercooler provided between the compressor and the engine in the turbocharger is an apparatus for cooling the high temperature air compressed by the compressor of the turbocharger to generate denser air and supplying the denser air to the engine.

As shown in FIG. 1, an upper portion of the intercooler 10 has an upper port 11 so as to receive the high temperature compressed air from the compressor, and a lower portion of the intercooler 10 has a lower port 12 coupled to an inlet tube 20 so as to supply cooled air to the engine.

The upper port 11 of the intercooler 10 is coupled to a connection pipe (or hose) connecting the intercooler 10 to the compressor of the turbocharger.

When the high temperature air compressed by the compressor of the turbocharger is cooled through heat-exchange in the intercooler 10, water vapor contained in air condenses to generate condensed water and the condensed water is collected on the lower portion of the intercooler 10.

In an embodiment of the present disclosure, the condensed water collected in the intercooler 10 is introduced toward the engine by using the ultrasonic wave vibrator (to be described below) and is vaporized to reduce an amount of condensed water in the intercooler 10, so that problems of engine damage and ignition failure due to the condensed water of the intercooler 10 may be overcome.

Figure 2:
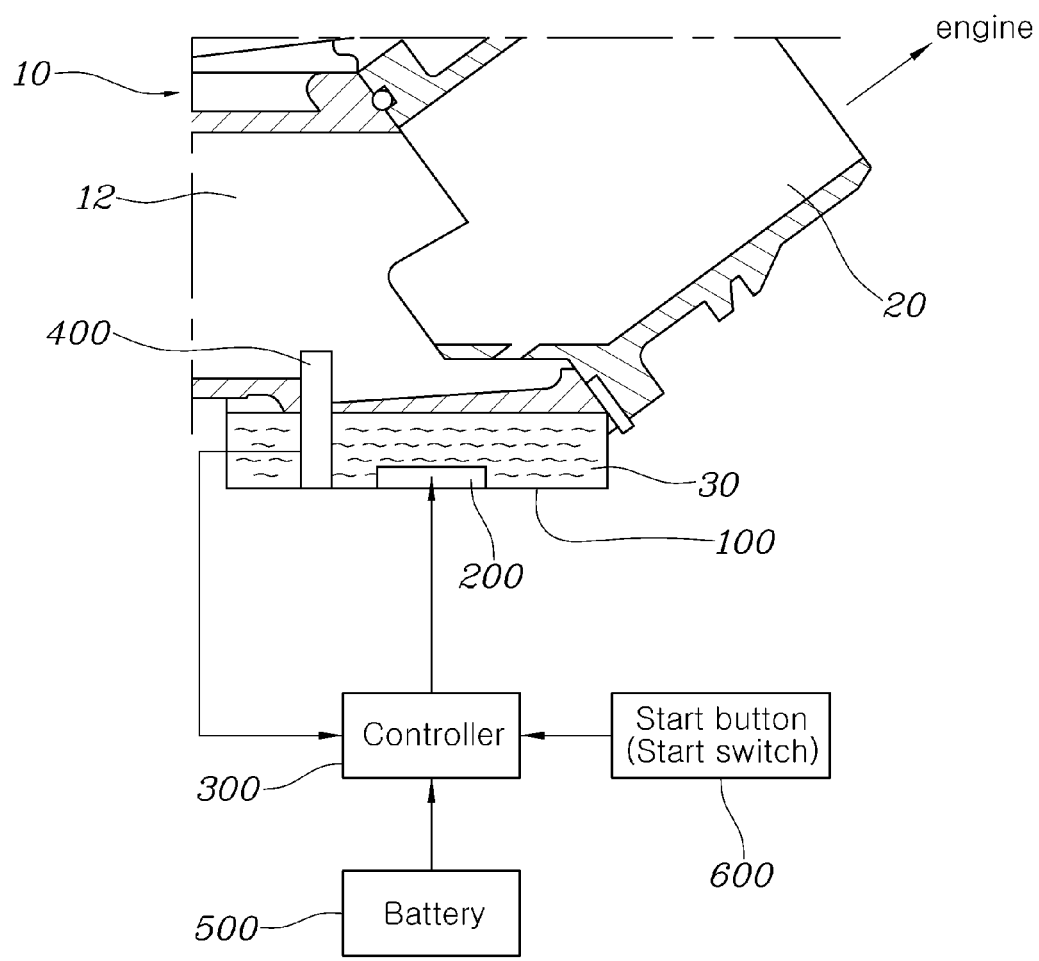
FIG. 2 is an enlarged view showing a portion where the apparatus for removing condensed water is provided, in FIG. 1.

According to the present disclosure, as shown in FIGS. 1 and 2, the apparatus for removing condensed water of the intercooler includes: a collecting portion 100 provided at the intercooler 10 and collecting the condensed water 30 of the intercooler 10; an ultrasonic wave vibrator 200 provided in the collecting portion 100 and generating vibration during operation of the ultrasonic wave vibrator 200; a controller 300 controlling the operation of the ultrasonic wave vibrator 200; and a condensed water sensor 400 provided in the collecting portion 100 and detecting an amount of collected condensed water.

The collecting portion 100 has a box shape capable of collecting the condensed water 30 therein and is fixed at a location where the lower portion of the intercooler 10 is connected to the inlet tube 20 connected to the engine.

The ultrasonic wave vibrator (e.g., piezoceramic) 200 preferably constitutes a vibrator humidifier, and the operation of the ultrasonic wave vibrator 200 is controlled by the controller 300. When the controller 300 controls a battery 500 so that power of the battery 500 is supplied to the ultrasonic wave vibrator, the ultrasonic wave vibrator vibrates approximately 300,000 times per second.

The ultrasonic wave vibrator 200 is fixed at the bottom of the collecting portion 100 on which the condensed water 30 is collected. When the ultrasonic wave vibrator 200 vibrates by electric current flowing through the ultrasonic wave vibrator 200, ultrasonic waves are generated to vibrate from the bottom of the collecting portion 100, water molecules of the condensed water 30 collected in the collecting portion 100 collide with each other and transmit the vibration upward, and when the vibration reaches a surface of the condensed water 30, water particles located on the surface of the condensed water 30 are finely bounced upward due to the vibration. When the condensed water particles are introduced to the engine through the inlet tube 20 and are vaporized, the condensed water 30 in the collecting portion 100 is removed and the condensed water 30 in the intercooler 10 may be removed or reduced.

The controller 300 controls the ultrasonic wave vibrator 200 so that the ultrasonic wave vibrator 200 is operated only when an amount of condensed water of the collecting portion 100 detected by the condensed water sensor 400 is equal to or higher than a reference value.

The controller 300 is configured to receive a signal of a start button (or start switch) 600, so the controller 300 may individually control the operation of the ultrasonic wave vibrator 200 depending on a situation of vehicle ignition ON or OFF.

The condensed water sensor 400 is a level sensor detecting a water level of the condensed water 30 collected in the collecting portion 100 and may use either an electronic sensor or a floating sensor.

Figure 3:
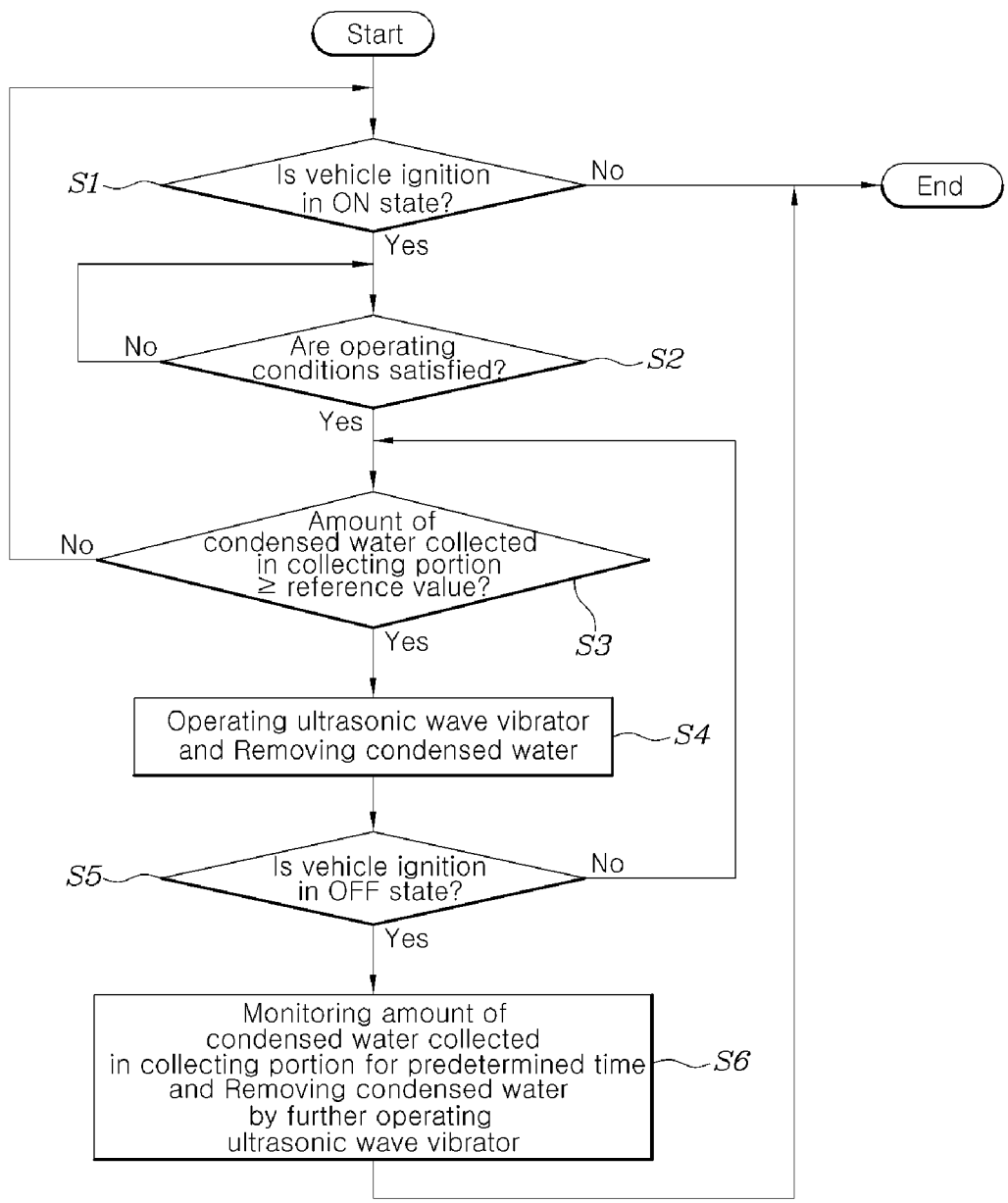
FIG. 3 is a flowchart showing a method for removing condensed water of the intercooler according to the present disclosure.

Hereinbelow, the method for removing condensed water of the intercooler according to the present disclosure will be described with reference to FIG. 3.

According to the present disclosure, the method for removing condensed water includes: determining operating conditions, wherein it is determined whether the operating conditions of the ultrasonic wave vibrator 200 are satisfied or not in a state of vehicle ignition ON; determining an amount of condensed water, wherein when it is determined that the operating conditions of the ultrasonic wave vibrator 200 are satisfied in the determining operating conditions, it is determined whether an amount of collected condensed water in the collecting portion 100 is equal to or higher than the reference value; and removing condensed water, wherein when it is determined that the amount of collected condensed water in the collecting portion 100 is equal to or higher than the reference value in the determining an amount of condensed water, the ultrasonic wave vibrator 200 is operated by control of the controller 300, the ultrasonic wave vibrator 200 is operated to allow the condensed water 30 collected in the collecting portion 100 to be introduced to the engine and be vaporized, so that the condensed water 30 in the collecting portion 100 is removed.

In a state of vehicle ignition ON (S1), the controller 300 determines whether the operating conditions of the ultrasonic wave vibrator 200 are satisfied or not (S2).

The logic of the present disclosure is terminated when the vehicle ignition is not the ON state.

In S2, the operating conditions of the ultrasonic wave vibrator 200 include an operation entry condition of the exhaust gas recirculation device (EGR), and state conditions of the ultrasonic wave vibrator 200, the condensed water sensor 400, and the battery 500.

As a result of the determination in step S2, only when the operating entry condition of the EGR is satisfied and the ultrasonic wave vibrator 200, the condensed water sensor 400, and the battery 500 are in normal states, the step of determining an amount of condensed water is performed (S3).

However, as the result of the determination in step S2, when the operating entry condition of the EGR is not satisfied or any one of the ultrasonic wave vibrator 200, the condensed water sensor 400, and the battery 500 is not in a normal state while the operating entry condition of the EGR is satisfied, the logic of the present disclosure does not perform the determining an amount of condensed water and repeats step S2.

As a result of the determination in step S2, when the operating conditions of the ultrasonic wave vibrator 200 are satisfied, it is determined whether an amount of collected condensed water in the collecting portion 100 is equal to or higher than the reference value (S3).

The amount of collected condensed water in the collecting portion 100 may be checked by the condensed water sensor 400. the controller 300 compares a detected value of the condensed water sensor 400 to the reference value to determine whether the amount of collected condensed water in the collecting portion 100 is equal to or higher than the reference value.

As a result of the determination in step S3, when the amount of collected condensed water in the collecting portion 100 is equal to or higher than the reference value, the ultrasonic wave vibrator 200 is operated by the control of the controller 300. When the ultrasonic wave vibrator 200 is operated, the condensed water 30 collected in the collecting portion 100 is introduced to the engine and is vaporized. Accordingly, the condensed water 30 in the collecting portion 100 is removed or significantly reduced, so the condensed water in the intercooler 10 may be removed or significantly reduced (S4).

However, as the result of the determination in step S3, when the amount of collected condensed water in the collecting portion 100 is less than the reference value, the logic of the present disclosure does not perform a next stage and goes back to S1.

The logic according to the present disclosure includes: performing post-processing for removing the condensed water 30 of the collecting portion 100, wherein after the removing condensed water, when it is determined that the vehicle ignition is in the OFF state, an amount of collected condensed water in the collecting portion 100 is monitored, and when it is determined that the amount of collected condensed water in the collecting portion 100 is equal to or higher than the reference value as a result of the monitoring, the condensed water is removed by additional operation of the ultrasonic wave vibrator 200.

After step S4, when it is determined that the vehicle ignition is in the OFF state as a result of determination of the vehicle ignition (S5), the controller 300 monitors the amount of collected condensed water in the collecting portion 100 for a predetermined time. When it is determined that the amount of collected condensed water in the collecting portion 100 is equal to or higher than the reference value as a result of the monitoring the ultrasonic wave vibrator 200 is further operated to perform the processing for removing the condensed water 30 in the collecting portion 100, whereby the condensed water 30 in the collecting portion 100 may be clearly removed (S6).

However, as a result of the determination in step S5, when the vehicle ignition is in the ON state, the logic of the present disclosure does not perform a next process and goes back to step S3.

In the performing post-processing (S6), the predetermined time required for monitoring an amount of condensed water includes a time when the condensed water 30 in the intercooler 10 is collected into the collecting portion 100 after the vehicle ignition is turned off. In particular, the monitoring time may be preferably set by considering a remaining amount of power of the battery 500 so that the monitoring is finished before the battery 500 is discharged after the vehicle ignition is turned off.

As described above, according to the embodiment of the present disclosure, the collecting portion 100 collecting the condensed water 30 is provided at a lower end of the intercooler 10, the ultrasonic wave vibrator 200 is provided in the collecting portion 100, the ultrasonic wave vibrator 200 is operated to introduce the condensed water 30 collected in the collecting portion 100 toward the engine so that the condensed water is vaporized, whereby the apparatus for removing condensed water of the present disclosure has the configuration capable of removing or significantly reducing an amount of condensed water in the intercooler 10. Accordingly, the problems of engine damage and ignition failure due to the condensed water of the intercooler 10 may be overcome.

Although preferred embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A method for removing condensed water of an intercooler, the method comprising:
determining operating conditions of an apparatus for removing condensed water of the intercooler, the apparatus comprising:

a collecting portion provided at the intercooler and configured to collect the condensed water of the intercooler;

an ultrasonic wave vibrator provided in the collecting portion and configured to generate vibration during operation of the ultrasonic wave vibrator; and a controller configured to control the operation of the ultrasonic wave vibrator, wherein it is determined whether the operating conditions of the ultrasonic wave vibrator are satisfied or not in a state of vehicle ignition ON;

determining an amount of condensed water, wherein when it is determined that the operating conditions of the ultrasonic wave vibrator are satisfied in determining the operation conditions, it is determined whether the amount of collected condensed water in the collecting portion is equal to or higher than a reference value;

removing condensed water, wherein when it is determined that the amount of collected condensed water in the collecting portion is equal to or higher than the reference value in the determining the amount of condensed water, the ultrasonic wave vibrator is operated under control of a controller and thus the collected condensed water in the collecting portion is introduced into an engine and then is vaporized due to operation of the ultrasonic wave vibrator, so that the condensed water in the collecting portion is removed; and performing post-processing for removing the condensed water in the collecting portion, wherein after the removing the condensed water, when it is determined that vehicle ignition is in a state of ignition OFF, the amount of condensed water in the collecting portion is monitored for a predetermined time, and when the collected amount of condensed water in the collecting portion is determined to be equal to or higher than the reference value by the monitoring, the condensed water is removed by additional operation of the ultrasonic wave vibrator.

2. The method of claim 1, wherein in determining the operating conditions, the operating conditions of the ultrasonic wave vibrator comprise an operating entry condition of an exhaust gas recirculation device, and state conditions of the ultrasonic wave vibrator, the condensed water sensor, and a battery.

3. The method of claim 2, wherein when it is determined that the operating entry condition of the exhaust gas recirculation device is satisfied and the ultrasonic wave vibrator, the condensed water sensor, and the battery are in a normal state, determining the amount of condensed water is performed.

4. The method of claim 1, wherein in performing the post-processing, the predetermined time required for monitoring the amount of condensed water comprises a time when the condensed water of the intercooler is collected into the collecting portion after vehicle ignition is turned off.

5. The method of claim 1, wherein in performing the post-processing, the predetermined time required for monitoring the amount of condensed water is determined by considering a remaining amount of battery power so that the monitoring is finished before a battery is discharged after vehicle ignition is turned off.

* * * * *